United States Patent [19]

Toyama et al.

[11] Patent Number: 5,715,729
[45] Date of Patent: Feb. 10, 1998

[54] MACHINE TOOL HAVING PARALLEL STRUCTURE

[75] Inventors: Taizo Toyama, Kariya; Yoichi Yamakawa; Hiroyoshi Suzuki, both of Aichi-ken, all of Japan

[73] Assignee: Toyoda Koki Kabushiki Kaisha, Kariya, Japan

[21] Appl. No.: 563,795

[22] Filed: Nov. 28, 1995

[30] Foreign Application Priority Data

Nov. 29, 1994 [JP] Japan .................................. 6-293591

[51] Int. Cl.⁶ ...................................................... B23Q 1/25
[52] U.S. Cl. .................. 74/490.03; 74/89.15; 409/201; 409/211; 409/235; 901/23; 901/28; 901/29
[58] Field of Search .................. 74/490.03, 490.06, 74/89.15; 408/234; 409/201, 211, 235, 241, 216; 901/23, 28, 29

[56] References Cited

U.S. PATENT DOCUMENTS

| | | | |
|---|---|---|---|
| 4,806,068 | 2/1989 | Kohli et al. | 414/735 |
| 4,819,496 | 4/1989 | Shelef | 74/490.03 |
| 4,976,582 | 12/1990 | Clavel | 901/23 X |
| 4,988,244 | 1/1991 | Sheldon et al. | 409/132 |
| 5,053,687 | 10/1991 | Merlet | 901/28 X |
| 5,259,710 | 11/1993 | Charles | 409/235 |
| 5,333,514 | 8/1994 | Toyama et al. | 74/490.06 |
| 5,378,282 | 1/1995 | Pollard | 901/29 X |
| 5,388,935 | 2/1995 | Sheldon | 409/201 |

FOREIGN PATENT DOCUMENTS 494565  7/1992  European Pat. Off. .................. 901/23

*Primary Examiner*—Charles A. Marmor
*Assistant Examiner*—Troy Grabow
*Attorney, Agent, or Firm*—Oblon, Spivak, McClelland, Maier & Neustadt, P.C.

[57] ABSTRACT

A machine tool of the present invention includes a base fixed to an outside fixed portion, a travelling plate to which a tool is to be attached, plural guide portions radially outwardly fixed to the base at a predetermined angle, and plural rods. Each of the plural guide portions is provided with a slide table movable in a longitudinal direction of the guide portion and an actuator for moving the slide table. One end of each rods is connected with one of the slide tables through first joint means and another end of each of the rods is connected to the traveling plate through second joint means.

7 Claims, 6 Drawing Sheets

MACHINE TOOL HAVING PARALLEL STRUCTURE

BACKGROUND OF THE INVENTION

1. Field of the Invention

The present invention relates to a machine tool in which plural arms are arranged between a base and a travelling plate in a parallel way. More particularly, it relates to a machine tool with a large stiffness so as to be used for machining under a heavy load.

2. Discussion of the Prior Art

The applicant has proposed a parallel robot having a six-degree-of-freedom in Japanese Patent Publication No. 6-270077 on which the U.S. Pat. No. 5,333,514 is based. As shown in FIG. 6, the disclosed robot of parallel structure is mainly composed of a base 1 fixed to an outside fixed portion, a travelling plate 2, and six arms 3 which connect the base 1 and the travelling plate 2. Three pairs of motors 8 are mounted on the base 1 at a predetermined spacing to drive three pairs of the arms 3, respectively. Each of the arms 3 has a link 4 swingably supported by the corresponding motor 8 and a rod 5, one end of which is connected to the link 4 through first joint means 6 such as a ball joint or a universal joint and the other end of which is connected to the travelling plate 2 through second joint means 7. With this configuration, the spatial position and the posture of the travelling plate 2 are controlled by a movement of six-degree-of-freedom when the six arms 3 are respectively driven by the six motors 8. A robot hand is attached to a bottom surface of the travelling plate 2 to carried out transfer and assembling of a workpiece.

The above-described parallel robot has the advantage that the load acting on each motor 8 can be reduced because the arms 3 are respectively driven by the plural motors 8. Further, the motors 8 as driving actuators are mounted on the fixed base 1, so that an entire weight of a moving portion which comprises the travelling plate 2, the links 4 and the rods 5 can be lightened. This enables the arms 3 to move at a higher speed.

However, in case where such parallel robot is used for a machining operation as a tool hand, i.e., when a tool is attached to the bottom surface of the travelling plate 2, as a substitute for the robot hand, to machine a workpiece, the arms 3 suffer from bending moments due to a heavy load acting on the travelling plate 2. Under the condition, motors which have capacity to output large torque are required, leading to an increase in size of the parallel robot. For this reason, the conventional parallel robot can be utilized for an operation under light load such as transfer of the light workpiece, but can not be utilized for an operation under heavy load such as the machining of the workpiece.

Besides, the machining such as drilling can be performed by a positioning mechanism in only three axes. In the conventional parallel robot, the position and posture of the travelling plate 2 are simultaneously controlled by a movement of six-degree-of-freedom. When the parallel robot is adopted in a machine tool for drilling, the control therefor becomes complex and involves waste.

SUMMARY OF THE INVENTION

Accordingly, it is an object of the present invention to provide an improved machine tool of a parallel structure with a large stiffness so as to be used for machining under a heavy load.

Another object of the present invention is to provide an improved machine tool of a parallel structure whose control is simplified.

Briefly, a machine tool of a parallel structure according to the present invention comprises a base, a travelling plate to which a tool is to be attached, plural guide portions radially outwardly fixed to the base at a predetermined angle, and plural rods. Each of the guide portions has a slide table movable in a longitudinal direction thereof and an actuator for moving the slide table. One ends of the rods are connected with the corresponding slide tables through first joint means, and the other ends of the rods are connected to the travelling plate through second joint means.

With this configuration, even when a reaction force acts on the travelling plate during the machining operation, no bending moments act on the rods. Consequently, the machine tool of the present invention can be used for machining under a heavy load.

In one aspect of the present invention, the number of the guide portions are six, and one rod is connected to the slide table of each guide portion. Therefore, the travelling plate can be moved with six-degree-of-freedom, during which the position and the posture of the travelling plate is simultaneously controlled.

In another aspect of the present invention, the number of the guide portions are three, and two rods are connected to the slide table of each guide portion. Therefore, the travelling plate can be moved with three-degree-of-freedom, during which the position of the travelling plate is controlled. Since each pairs of rods make parallel linkage, the travelling plate is always maintained to the parallel relationship with the base. Thus, the posture of the travelling plate is always determined. This brings an easy control for the machine tool.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENT

Preferred embodiments of the present invention will be described hereinafter with reference to drawings.

Figure 1:
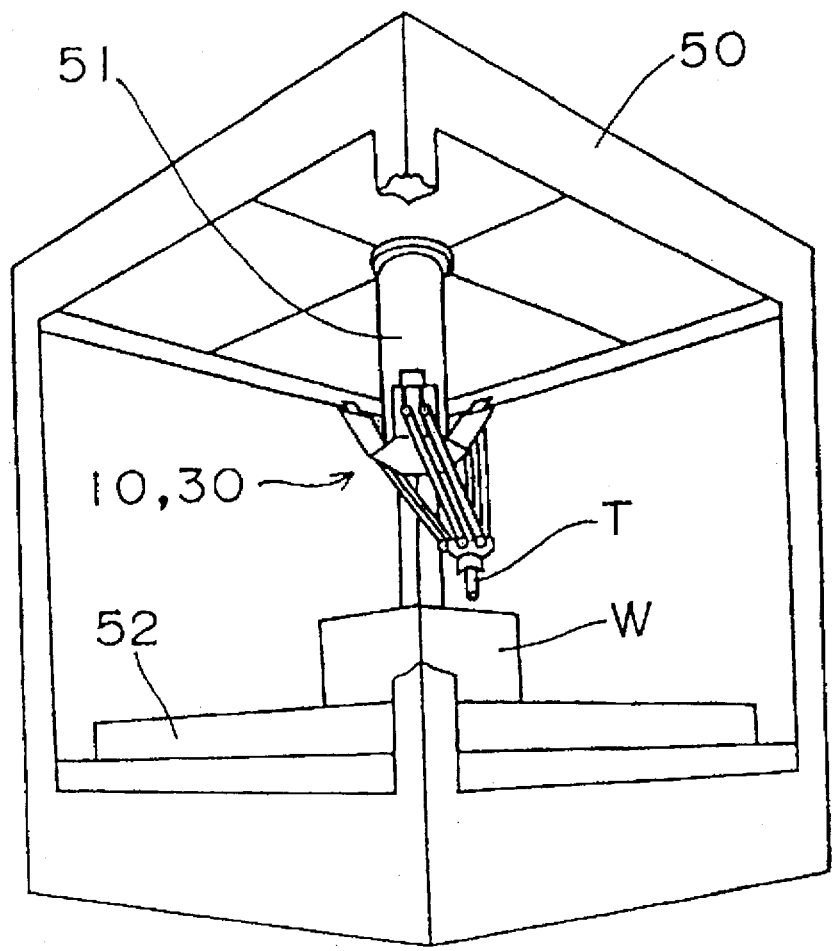
FIG. 1 is a view showing an entire structure of a machine tool according to the present invention.

FIG. 1 is a view showing an entire structure of a machine tool according to the present invention. In the entire structure of the machine tool, a machine tool 10 (30) is supported by a support column 51 to a ceiling of a gantry-shaped frame 50. A tool T attached to the machine tool 10 (30) is moved to a desired position to machine a workpiece W mounted on a table 52.

FIRST EMBODIMENT

Figure 2:
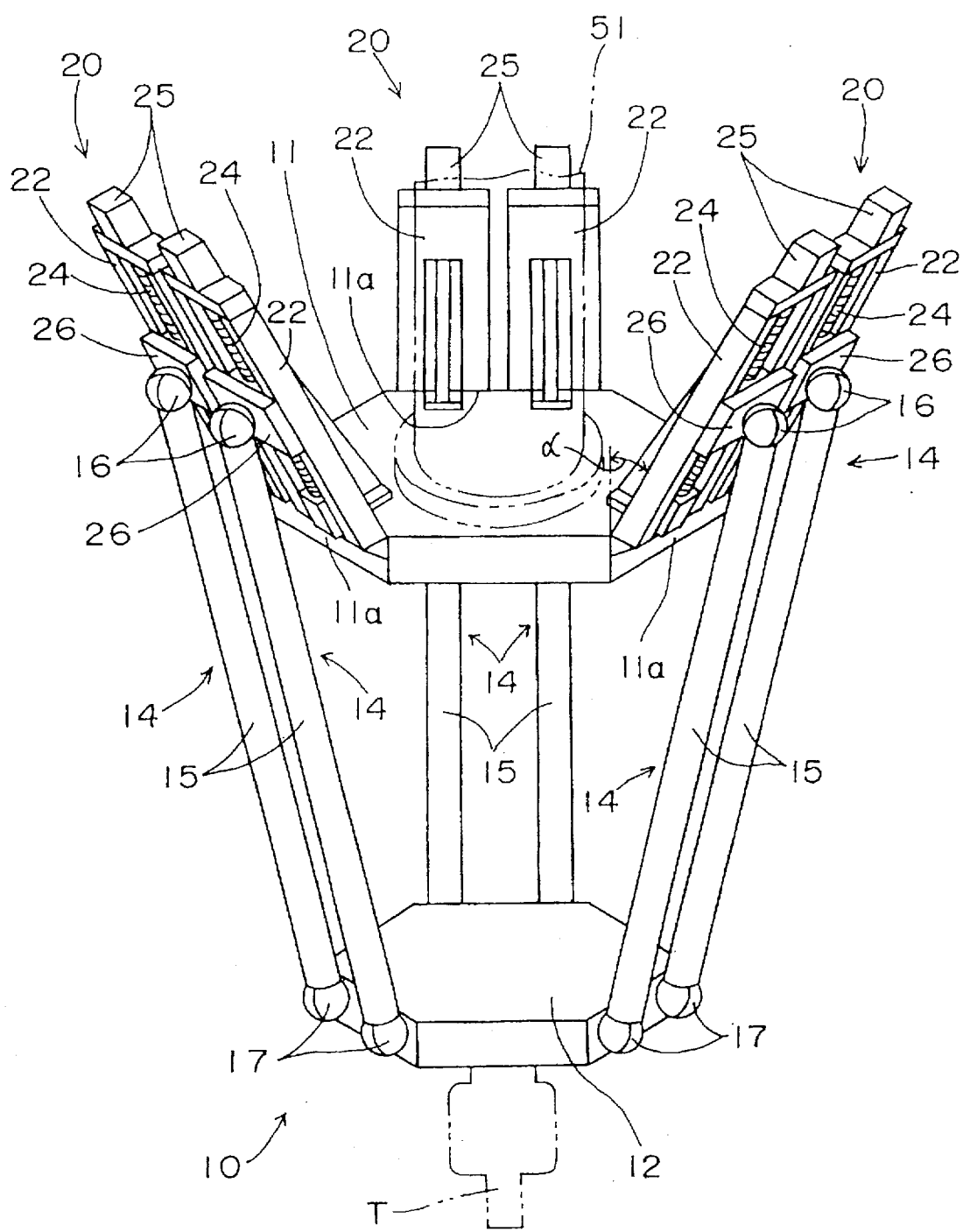
FIG. 2 is a perspective view of a main portion of a machine tool according to the first embodiment of the present invention.

FIG. 2 is a perspective view of the machine tool 10 according to the first embodiment of the present invention. The machine tool 10 is mainly composed of a base 11 fixed to an outside fixed portion (the frame 50 in the present invention) by the support column 51, a travelling plate 12 to which a tool T such as a drill or an end mill is to be attached, and six arms 14 which connect the base 11 and the travelling plate 12. The base 11 is of a hexagonal shape, and the six arms 14 are arranged at alternate three sides 11a of the base 11 in pairs to constitute three arm assemblies having the same structure with equal spacing.

Each of the arms 14 has a rod 15 and a guide mechanism 20 for guiding the rod 15. Each of the guide mechanisms 20 comprises a guide base 22 having a groove which brings a U-like section, a ball screw 24 extending in the longitudinal direction of the guide base 22 and rotatably supported in the groove, a motor 25 coupled with one end of the ball screw 24 for rotating it, and a slide table 26 whose not-illustrated nut is engaged with the ball screw.24. With this configuration, when the motor 25 fixed to each guide base 22 is activated to rotate the ball screw 24, the slide table 26 is moved in the longitudinal direction of the guide base 22.

Two guide mechanisms 20 of two arms 14 of each arm assembly are secured to the base 11 side by side in such a state that the ball screws 24 thereof extend radially outwardly of the base 11. The inclined angle α of the two guide mechanisms 20 is set to a predetermined one (an angle of 45°, for example).

One end of the rod 15 of each arm 14 is connected to the corresponding slide table 26 through first joint means such as a ball joint 16. Each rod 15 is therefore swingable in three-dimensional directions with respect to the corresponding slide table 26, with each ball joint 16 acting as a point. The other end of the rod 15 of each arm 14 is connected to the travelling plate 12 through second joint means such as a ball joint 17, so that each rod 15 is swingable in three-dimensional directions with respect to the travelling plate 12, with each ball joint 17 acting as a point. The travelling plate 12 is provided on the bottom surface with a not-illustrated main spindle to which the tool T is detachably attached.

When the motors 25 of the six guide mechanism 20 are respectively activated in response to command signals from a not-illustrated controller, the six slide tables 26 are respectively moved in the longitudinal direction of the guide bases 22, whereby the six rods 15 connected to the slide tables 26 swing individually. The combination of the swing movements of the six rods 15 enables the travelling plate 12 to be controlled in six-degree-of-freedom, that is in its position and posture. To be precise, the positioning of the travelling plate 12 is carried out by three pairs of arms 14 each of which is individually controlled. On the other hand, the posture of the travelling plate 12 is determined by three arms 14 each of which is one of two arms 14 of each arm assembly. In this manner, the tool T attached to the travelling plate 12 is moved to desired position and posture so as to machine the workpiece.

As described above, in the machine tool 10 of the first embodiment, the travelling plate 12 is moved by the six arms 14 with six-degree-of-freedom, during which the position and the posture thereof are simultaneously controlled. Each of the arms 14 is composed of one rod 15 and one guide mechanism 20 fixed to the base 11 at a predetermined angle for guiding the rod 15. A reaction force acting on the travelling plate 12 during the machining operation is converted to compressive forces or tension forces acting on all rods 15 through the ball joints 17. These forces become the forces in the moving directions of the slide tables 26 through the ball joints 16 and the slide tables 26, that is a load in the axial direction of the ball screws 24. Under the condition, no bending moments act on the arms 14, and a heavy load is not directly applied to each motor 25. For the above reasons, the machine tool 10 of the first embodiment can be utilized for the machining operation during which the heavy load is applied to the travelling plate 12.

SECOND EMBODIMENT

Figure 3:
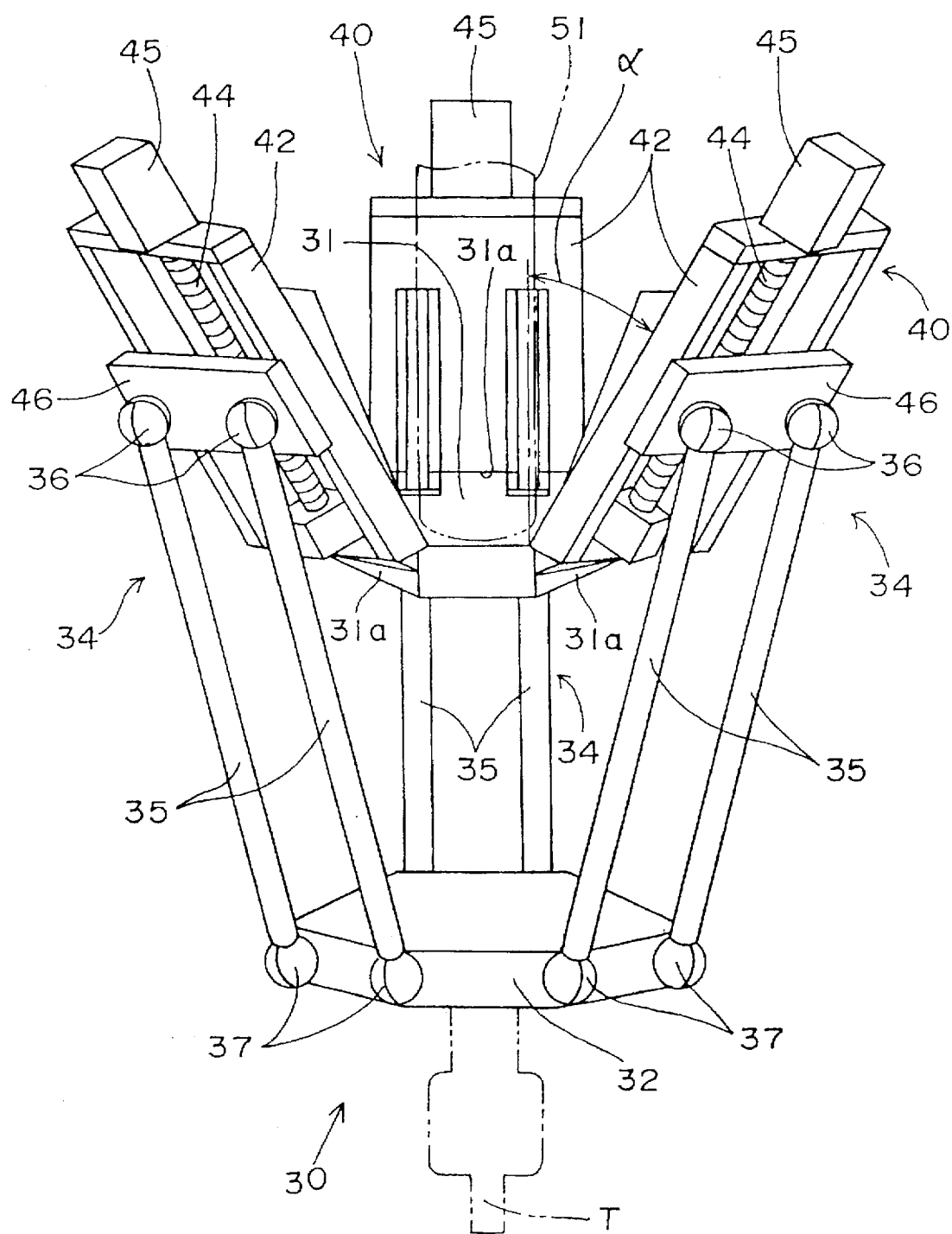
FIG. 3 is a perspective view of a main portion of a machine tool according to the second embodiment of the present invention.

Referring now to FIG. 3, the machine tool 30 of the second embodiment is mainly composed of a base 31 fixed to an outside fixed portion (the frame 50 in the present invention) by the support column 51, a travelling plate 32 to which a tool T such as a drill or an end mill is to be attached, three arms 34 which connect the base 31 and the travelling plate 32. The base 31 is of a hexagonal shape, and the three arms 34 are arranged at alternate three sides 31a of the base 11 with equal spacing.

Each of the arms 34 has two rods 35 and a guide mechanism 40 for guiding both rods 35. Each of the guide mechanisms 40 comprises a guide base 42 having a groove which brings a U-like section, a ball screw 44 extending in the longitudinal direction of the guide base 42 and rotatably supported in the groove, a motor 45 coupled with one end of the ball screw 44 for rotating it, and a slide table 46 whose not-illustrated nut is engaged with the ball screw 44. With this configuration, when the motor 45 fixed to each guide base 42 is activated to rotate the ball screw 44, the slide table 46 is moved in the longitudinal direction of the guide base 42.

The guide mechanism 40 of each arm 34 is secured to the base 31 in such a state that the ball screw 44 thereof extends radially outwardly of the base 31. The inclined angle α of the guide mechanisms 40 is set to a predetermined one (an angle of 45°, for example).

One ends of the two rods 35 of each arm 34 are connected to the corresponding one slide table 46 through two first joint means such as ball joints 36, with predetermined spacing. Two rods 35 of each arm 34 are therefore swingable in three-dimensional directions with respect to the corresponding one slide table 46, with the ball joints 36 acting as points. The other ends of the two rods 35 of each arm 34 are connected to the travelling plate 32 through two second joint means such as ball joints 37 in such a manner that the two rods 35 of each arm 34 are parallel to each other. Two rods 35 of each arm 34 are therefore swingable in three-dimensional directions with respect to the travelling plate 32, with the ball joints 37 acting as points. In each arm 34 thus constructed, the slide table 46 and the two rods 35 constitute a parallel linkage with the travelling plate 32. The travelling plate 32 is provided on its bottom surface with a not-illustrated main spindle to which the tool T is detachably attached.

When the motors 45 of the three guide mechanisms 40 are respectively activated in response to command signals from a not-illustrated controller, the three slide tables 46 are respectively moved in the longitudinal direction of the guide bases 42, whereby the three pairs of rods 35 connected to the slide tables 46 swing individually. Since each pair of rods 35 connected to the one slide table 46 always effect a parallelogram, the travelling plate 32 always stays parallel to the base 31. The swing movements of the three pairs of rods 35 are combined so that the travelling plate 32 can be controlled in three-degree-of-freedom, that is in its position. In this manner, the tool T attached to the travelling plate 32 is moved to desired position to machine a workpiece, with staying parallel to the base 31.

In the machine tool 30 of the second embodiment, the travelling plate 32 can be moved by the three arms 34 with three-degree-of-freedom, during which the position thereof is controlled. Each of the arms 34 is composed of two rods 35 and one guide mechanism 40 fixed to the base 31 at a predetermined angle for guiding the two rods 35, the two rods 35 making the parallel linkage. Therefore, the travelling plate 32 is always maintained to the parallel relationship with the base 31, so that the posture of the travelling plate 32 is inevitably determined. This brings an easy control for the machine tool 30. For the same reasons as the machine tool 10 of the first embodiment, no bending moments act on the arms 34 and a heavy load is not directly applied to each motor 45. Consequently, the machine tool 30 of the second embodiment can be also utilized for the machining operation during which the heavy load is applied to the travelling plate 32.

Figure 4:
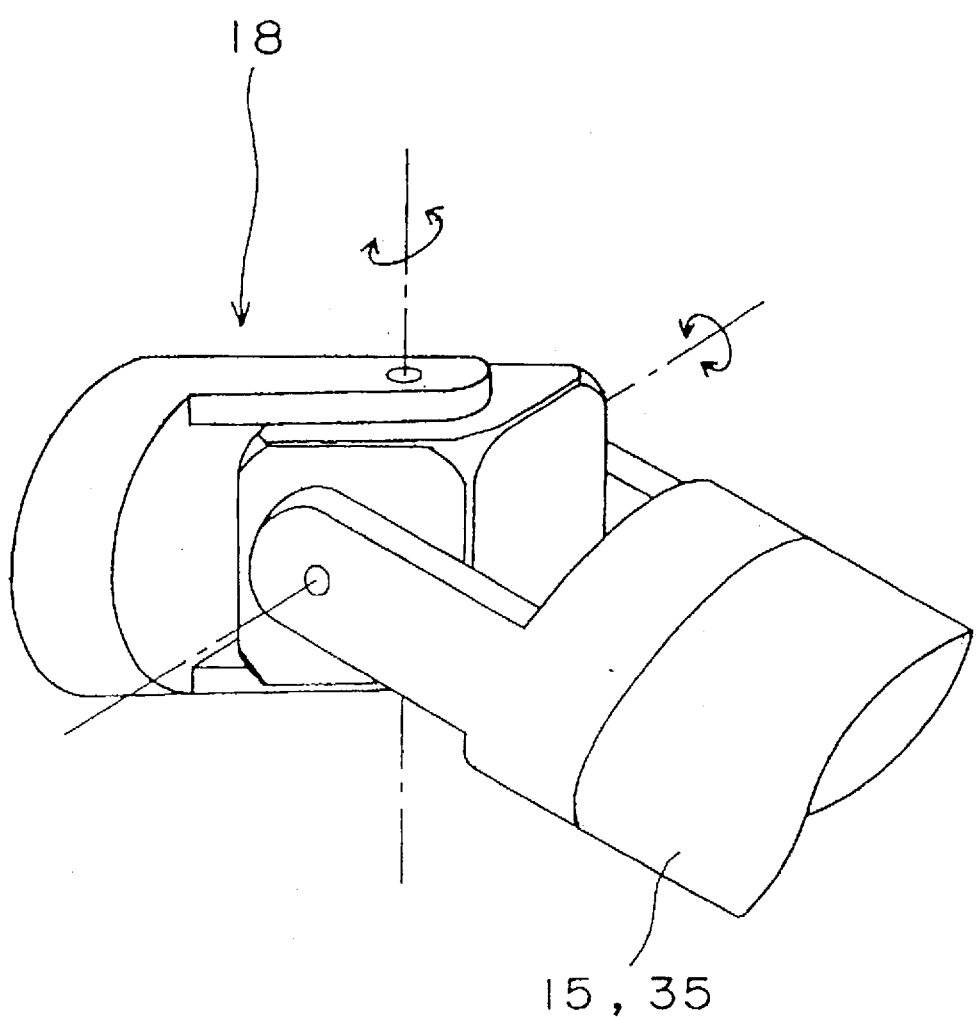
FIG. 4 is an enlarged view of a universal joint used as joint means.
Figure 5:
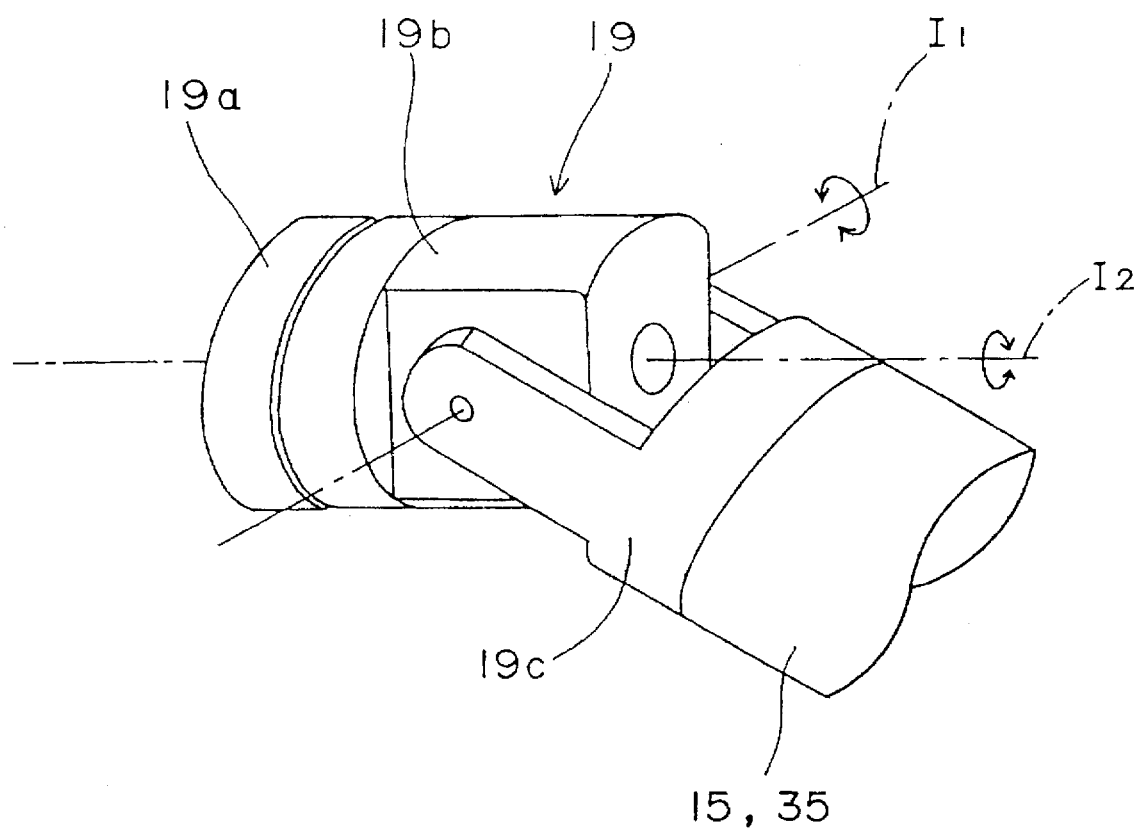
FIG. 5 is an enlarged view of an another joint having two-degree-of-freedom and used as joint means.
Figure 6:
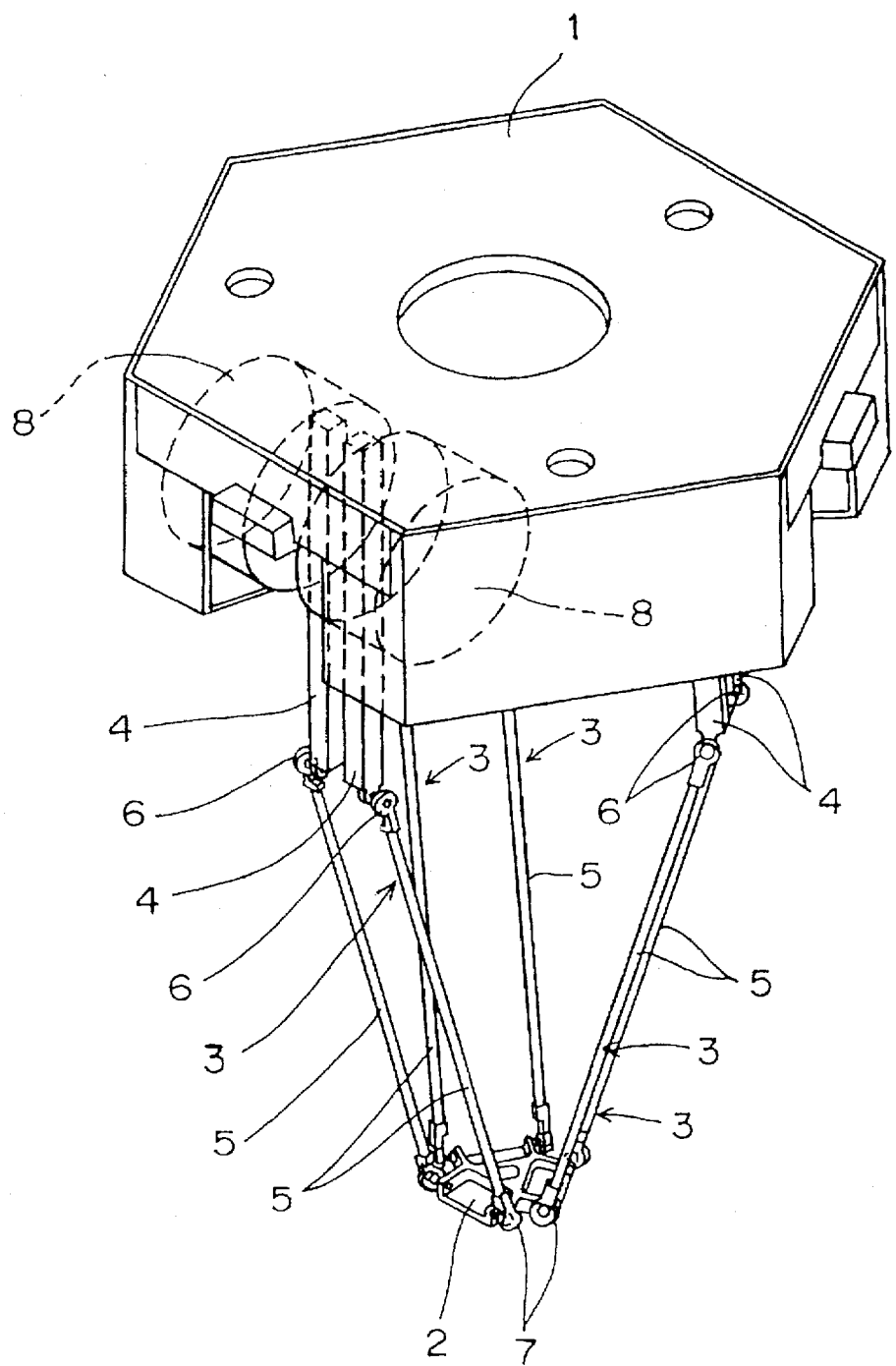
FIG. 6 is a perspective view of a conventional parallel robot.

In the first embodiment, the ball joints 16 and 17 are used as the first and second joint means for connecting both ends of the rod 15 of each arm 14 to the corresponding slide table 26 and the travelling plate 12, respectively. Similarly, in the second embodiment, the ball joints 36 and 37 are used as the first and second joint means for connecting both ends of the two rods 35 of each arm 34 to the corresponding one slide table 46 and the travelling plate 32, respectively. Each of these ball joints 16, 17, 36 and 37 presents three-degree-of-freedom, but either the first joint means or the second joint means for each rod 15, 35 may be replaced by a well-known universal joint 18 shown in FIG. 4 or a joint 19 shown in FIG. 5. In the joint 19, an intermediate member 19b is rotatable about an axis $I_2$ with respect to a fixture 19a fixed to each slide table 26, 46 or the travelling plate 12, 32. A connection member 19c connected to each rod 15, 35 is rotatable about an axis $I_1$ perpendicular to the axis $I_2$ with respect to the intermediate member 19b. As a result, the joint 19 presents two-degree-of-freedom.

Further, in the first and second embodiments described above, the slide table 26, 46 of each guide mechanism 20, 40 is moved by the ball screw 24, 44 and the motor 25, 45. Each slide table 26, 46 may be directly driven by a linear motor.

Incidentally, the machine tool 10 of the first embodiment may be controlled in only three-degree-of-freedom, similarly to the machine tool 30 of the second embodiment. In this case, for example, each ball joint 16 is divided into two parts, and two rods 15 of each arm assembly are connected to each other by the divided ball joints 16. When two motors 25 of each arm assembly are synchronously activated, the two rods 15 connected to each other make parallel linkage.

Obviously, numerous modifications and variations of the present invention are possible in light of the above teachings. It is therefore to be understood that within the scope of the appended claims, the present invention may be practiced otherwise than as specifically described herein.

What is claimed is:

1. A machine tool comprising:

a base having a center;

a traveling plate to which a tool is to be attached;

plural guide portions fixed to said base, each portion extending at an inclined angle relative to said base and each portion extending radially away from said center; and plural rods, wherein:

each of said plural guide portions is provided with a guide base and a slide table movable in a longitudinal direction of said guide base and an actuator for moving said slide table; and one end of each of said rods is connected with one of said slide tables through first joint means and another end of each of said rods is connected to said traveling plate through second joint means.

2. A machine tool as set forth in claim 1, wherein:

the number of said guide portions is six;

the number of sides of said base is six:

said six guide portions are arranged in pairs with each pair being connected to one of the sides of the base; the sides to which the pairs are connected alternating with sides to which pairs are not connected.

3. A machine tool as set forth in claim 1, wherein:

the number of said guide portions is three;

the number of sides of said base is six; said three guide portions are each connected to one of the sides of said base, the sides to which the guide portions are connected alternating with sides to which the guide portions are not connected;

the number of said rods is six; and one end of each of two rods is connected with said slide table of each guide portion at a predetermined spacing and another end of each of two rods is connected to said traveling plate so that said two rods are parallel to each other.

4. A machine tool as set forth in claim 1, wherein said first joint means and/or said second joint means present three-degree-of-freedom.

5. A machine tool as set forth in claim 2 or 3, wherein said actuators are respectively fixed to said guide bases.

6. A machine tool as set forth in claim 2 or 3, wherein said first joint means and/or said second joint means present three-degree-of-freedom.

7. A machine tool as set forth in claim 2 or 3, wherein said inclined angle is 45°.

* * * * *